US007796267B2

(12) United States Patent
Saadany et al.

(10) Patent No.: US 7,796,267 B2
(45) Date of Patent: Sep. 14, 2010

(54) SYSTEM, METHOD AND APPARATUS FOR A MICROMACHINED INTERFEROMETER USING OPTICAL SPLITTING

(75) Inventors: Bassam Amanallah Saadany, Nasr (EG); Diaa Abdelmaguid Khalil, Nasr (EG); Tarik Essif Eddine Bourouina, Allaire (FR)

(73) Assignee: Si-Ware Systems, Cairo (EG)

( * ) Notice: Subject to any disclaimer, the term of this patent is extended or adjusted under 35 U.S.C. 154(b) by 251 days.

(21) Appl. No.: 11/900,885

(22) Filed: Sep. 13, 2007

(65) Prior Publication Data
US 2008/0080034 A1   Apr. 3, 2008

Related U.S. Application Data

(60) Provisional application No. 60/848,018, filed on Sep. 28, 2006.

(51) Int. Cl.
*G01B 9/02* (2006.01)
(52) U.S. Cl. ...................................... 356/450
(58) Field of Classification Search .................. 356/484
See application file for complete search history.

(56) References Cited

U.S. PATENT DOCUMENTS

| 4,632,553 | A |   | 12/1986 | Vidring et al. |
| 5,087,124 | A | * | 2/1992 | Smith et al. .................. 356/482 |
| 5,159,408 | A | * | 10/1992 | Waldenmaier et al. ...... 356/485 |
| 5,501,893 | A |   | 3/1996 | Laermer et al. |
| 5,628,917 | A | * | 5/1997 | MacDonald et al. ........... 216/2 |
| 7,180,603 | B2 | * | 2/2007 | Hill et al. ..................... 356/500 |
| 2005/0110971 | A1 | * | 5/2005 | Maria Beems et al. ........ 355/53 |
| 2007/0115478 | A1 | * | 5/2007 | Ray ............................ 356/487 |
| 2007/0263204 | A1 | * | 11/2007 | Ju .............................. 356/4.09 |
| 2008/0204879 | A1 | * | 8/2008 | Manzardo et al. ........... 359/566 |
| 2008/0259344 | A1 | * | 10/2008 | Osborn et al. ............... 356/450 |

OTHER PUBLICATIONS

O. Manzardo, et al., "Micro-fabricated System for Wavelengths Monitoring," Optical MEMS'02, Lugano, Switzerland, Aug. 20-23, (2002), pp. 23-24.
K. Yu et al., "Micromachined Fourier Transform Spectrometer On Silicon Optical Bench Platform," The 13th International Conference on Solid-State Sensors, Actuators and Microsystems, TRANSDUCERS'05, Seoul Korea, Jun. 5-9, pp. 1250-1254 (2005).
F. Marty, et al., "High Aspect Ratio Nano-Structures (HARNS) for Photonic MEMS Based on Vertical DBR Architecture," The 13th International Conference on Solid-State Sensors, Actuators and Microsystems, TRANSDUCERS'05, Seoul Korea, Jun. 5-9, pp. 1449-1452 (2005).
B. Saadany, et al., "A Miniature Michelson Interferometer Using Vertical Bragg Mirrors on SOI," Optical MEMS'06, Big Sky, Montana USA.

* cited by examiner

*Primary Examiner*—Tarifur Chowdhury
*Assistant Examiner*—Jonathon D Cook
(74) *Attorney, Agent, or Firm*—Holly L. Rudnick

(57) ABSTRACT

A micromachined interferometer is achieved using a half plane beam splitter. The beam splitter is optically coupled to receive an incident beam and operates to split the incident beam into two interfering beams, each propagating in a different medium. A fixed mirror embedded in one of the mediums reflects one of the interfering beams back towards the half plane beam splitter through such medium, while a moveable mirror, which is controlled by an actuator, reflects the other interfering beam back towards said half plane beam splitter through the other medium. A detection plane detects an interference pattern produced as a result of interference between the reflected interfering beams.

17 Claims, 6 Drawing Sheets

SYSTEM, METHOD AND APPARATUS FOR A MICROMACHINED INTERFEROMETER USING OPTICAL SPLITTING

CROSS REFERENCE TO RELATED PATENTS

This U.S. application for patent claims the benefit of the filing date of U.S. Provisional Patent Application entitled, System, Method and apparatus for a micromachined interferometer using optical splitting, having Ser. No. 60/848,018, filed on Sep. 28, 2006, which is incorporated herein by reference for all purposes.

BACKGROUND OF THE INVENTION

1. Technical Field of the Invention

The present invention relates in general to optical MEMS, and in particular, to micromachined interferometers.

2. Description of Related Art

Micro Electro-Mechanical Systems (MEMS) refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. MEMS devices are attractive candidates for use in spectroscopy, profilometry, environmental sensing, refractive index measurements (or material recognition), as well as several other sensor applications, due to their low cost, batch processing ability and compatibility with standard microelectronics. In addition, the small size of MEMS devices enables the integration of equipment incorporating MEMS devices, such as MEMS-based Michelson Interferometers, into mobile and hand held devices.

Moreover, MEMS technology, with its numerous actuation techniques, enables the realization of new functions and features of photonic devices, such as optical tunability and dynamic sensing applications. For example, by using MEMS actuation (electrostatic, magnetic or thermal) to control a movable mirror of a Michelson Interferometer, small displacements in the interferometer optical path length can be introduced, and consequently, a differential phase between the interfering beams can be obtained. The resulting differential phase can be used to measure the spectral response of the interferometer beam (e.g., using Fourier Transform Spectroscopy), the velocity of the moving mirror (e.g., using the Doppler Effect), or simply as an optical phase delay element.

MEMS-based Michelson Interferometers have been realized using Silicon On Insulator (SOI) technology, where beam splitting is performed using a thin wall of silicon (Si) or glass. However, the performance of current MEMS-based Michelson Interferometers is highly dependent on the thickness of the silicon or glass wall. In practice, the industrialization of such a device has been problematic, since repeatability of performance is highly sensitive to the fabrication process parameters. Another problem with using conventional thin silicon wall beam splitters is the spectral sensitivity of the "beam splitting ratio", since the two Si/Air interfaces of the beam splitter contribute a parasitic Fabry-Pérot effect, thus modulating the power splitting ratio versus wavelength. This parasitic effect naturally degrades the performance of the Michelson Interferometer due to the noise introduced by operating in different wavelengths. Another problem in conventional beam splitters is the interference of the two separated beams from the two surfaces of the splitter. A silicon beam splitter was proposed in U.S. Pat. No. 4,632,553 to Vidring, et al., where the splitter was configured in a wedge shape. This wedge shape employed two splitting surfaces with different angles to avoid interference of the separated beams. However, although the wedge-shaped beam splitter solves the beam separation problem, it still suffers from the same problems of fabrication tolerance and parasitic dependence of "beam splitting ratio" on wavelength.

Therefore, there is a need for a more robust and more accurate micromachined interferometer. In particular, there is a need for a micromachined interferometer that exhibits a higher tolerance to the fabrication process, as well as a more stable spectral response of the beam splitting ratio.

SUMMARY OF THE INVENTION

Embodiments of the present invention provide a micromachined interferometer that uses a half plane beam splitter to produce a wavelength-independent, robust interferometer. The beam splitter is optically coupled to receive an incident beam and operates to split the incident beam into two interfering beams, each propagating in a different medium. A fixed mirror embedded in one of the mediums reflects one of the interfering beams back towards the half plane beam splitter through such medium, while a moveable mirror, which is controlled by an actuator, reflects the other interfering beam back towards said half plane beam splitter through the other medium. A detection plane detects the interference pattern produced as a result of interference between the reflected interfering beams. In an exemplary embodiment, the actuator causes a displacement of the moveable mirror that produces an optical path length difference between the two interfering beams equal to twice the moveable mirror displacement.

In one embodiment, the first medium is silicon and the second medium is air. In other embodiments, the first medium is silicon or glass and the second medium is a gas or liquid. In further embodiments, the mirrors are metallic mirrors or non-metallic vertical Bragg mirrors.

Embodiments of the present invention further provide a method for fabricating a micromachined interferometer. The method includes providing a silicon on insulator (SOI) wafer including a top layer and a bottom layer and photolithographically defining within the top surface of the SOI wafer a fiber groove optically coupled to receive an incident beam, a half plane beam splitter optically coupled to split the incident beam into two interfering beams, a moveable mirror optically coupled to reflect one of the interfering beams through a first medium, a fixed mirror optically coupled to reflect the other interfering beam through a second medium, a detection plane optically coupled to detect an interference pattern produced from the reflected interfering beams and an actuator coupled to control the moveable mirror. The method further includes etching between the top and bottom layers of the SOI wafer to release the moveable mirror and the actuator.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

In accordance with embodiments of the present invention, a single silicon-air interface (a half plane) is used to perform beam splitting in a micromachined interferometer for use in applications such as spectrometry, profilometry, vibrometery, environmental sensing, telecom etc. In embodiments of the present invention, the interferometer may be, for example, a Michelson interferometer, a Mach-Zehnder interferometer or a Twyman-Green interferometer. However, for simplicity, the present invention will be described with reference to a Michelson interferometer. The interferometer is realized over an SOI wafer to allow for a MEMS-actuated moving mirror. Due to the fact that the Silicon/Air interface spectral response is flat over the silicon spectral window, the interferometer splitting ratio has no wavelength dependence as in conventional silicon wall beam splitters.

Figure 1:
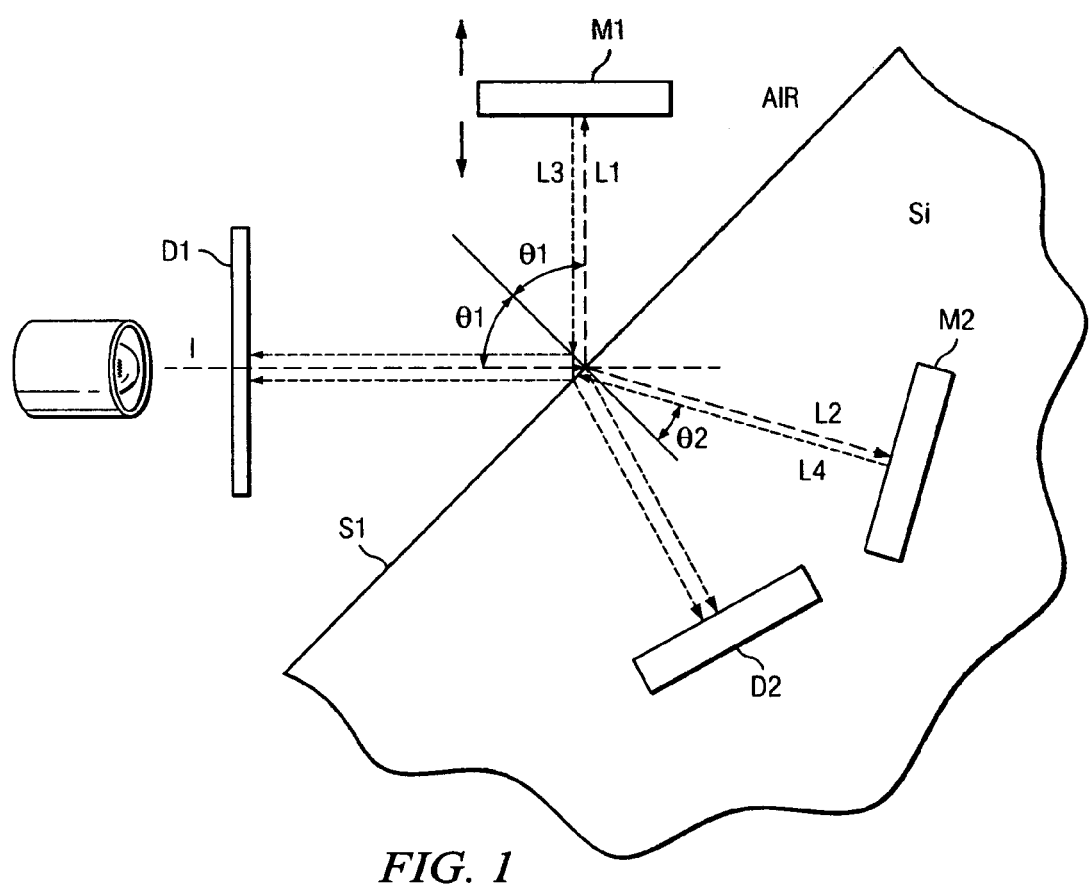
FIG. 1 is a pictorial diagram illustrating an exemplary operation of a micromachined interferometer in accordance with embodiments of the present invention.

Referring now to FIG. 1, the Silicon/Air interface beam splitter S1 is positioned at an angle θ1 (for example, 45 degrees) from the incident beam 1. The incident beam is thus split in two beams L1 and L2, where L1 propagates in air and L2 propagates in silicon. L1 originates from the partial reflection of the incident beam 1 from the silicon/Air half plane beam splitter S1, and thus has a reflection angle equal to the beam incidence angle θ1. L1 propagates in air until reflected from mirror M1, thus producing reflected beam L3.

L2 originates from the partial transmission of the incident beam 1 through silicon/Air half plane beam splitter S1 and propagates in silicon at an angle θ2 (determined by Snell's law). L2 continues to propagate in silicon until reflected by mirror M2, thus producing reflected beam L4. Mirror M2 is fixed and embedded in the silicon medium at a perpendicular angle to the beam L2. As shown in FIG. 1, both beams L3 and L4 take the same optical path (in the opposite direction) after reflection from mirrors M1 and M2 respectively, thus producing an interference pattern (illustrated by dotted lines) that can be detected on either of the detection planes D1 or D2, which can be, for example, photodetectors. In an exemplary embodiment, mirror M1 is movable using SOI electrostatic comb drive actuation, thus allowing for an optical path length difference equal to double the mirror displacement.

Figure 2:
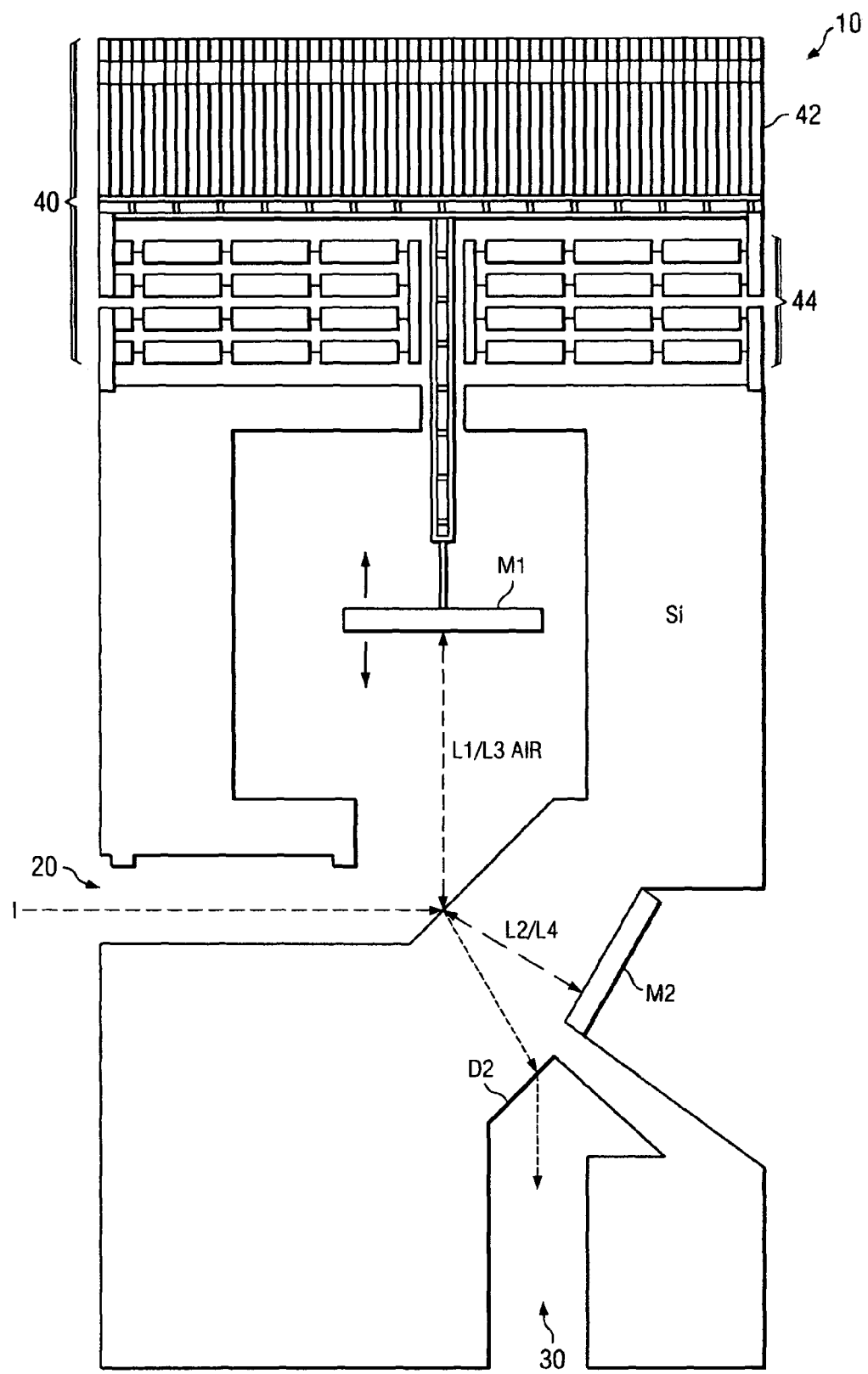
FIG. 2 is a layout diagram of an exemplary micromachined interferometer in accordance with embodiments of the present invention.

FIG. 2 is a layout diagram of a micromachined interferometer 10, in accordance with embodiments of the present invention. The micromachined interferometer 10 includes the silicon/air half plane beam splitter S1, input and output fiber grooves 20 and 30, moving mirror M1, fixed mirror M2 and an electrostatic actuator 40. In an exemplary embodiment, as shown in FIG. 2, the electrostatic actuator 40 is formed of a comb drive 42 and spring 44.

In an exemplary operation, the incident beam 1 enters the device 10 through the input fiber groove 20. Upon impinging the half plane beam splitter S1, the incident beam 1 is split into two beams L1 and L2. L1 propagates in air towards mirror M1, while L2 propagates in silicon towards mirror M2. Mirror M2 is fixed and embedded in the silicon medium at a perpendicular angle to the beam L2. However, as described above, mirror M1 is moveable using the MEMS electrostatic actuator 40, allowing for an optical path length difference between beams L1 and L2 equal to double the mirror displacement. For example, by applying a voltage to the comb drive 42, a potential difference results across the actuator 40, which induces a capacitance therein, causing a driving force to be generated as well as a restoring force from the spring 42, thereby causing a displacement of mirror M1 to the desired position for reflection of the beam L1.

As shown in FIG. 2, beams L1 and L2 take the same optical path (in the opposite direction) after reflection from mirrors M1 and M2 respectively, thus producing an interference pattern (illustrated by dotted lines) that can be detected on detection plane D2, or output via output fiber groove 30. As described above, detection plane D2 can be, for example, a photodetector that is assembled through micromachining in the substrate (e.g., by etching the top surface of the substrate to realize an opening within which the photodetector may be placed) or that is realized monolithically within the substrate either through doping (e.g., to realize a P-I-N diode) or partial metallization (e.g., to realize metal-semiconductor-metal MSM photodetector).

In one embodiment, mirrors M1 and M2 are metallic mirrors, where selective metallization (e.g. using a shadow mask during metallization step) is used to protect the beam splitter. In another embodiment, vertical Bragg mirrors are used to obtain a small foot print interferometer. The Bragg mirrors can be realized using Deep Reactive Ion Itching (DRIE), thus producing successive vertical Silicon/Air interfaces. In addition, the Bragg mirrors can be designed either to have a wide spectrum reflection response to act as simple reflectors or with a wavelength selective response, depending on the application.

Although a silicon/air interface is described herein for the beam-splitter, other materials providing a half wave plane can be used to realize the invention. For example, in another exemplary embodiment, micromachined or assembled glass half-planes or other materials, such as Pyrex, can be used instead of silicon to allow for a wider spectral window of operation. In addition, other materials, such as liquids or different gases, can be used instead of air to provide a degree of freedom to modify the reflection coefficient of the half plane beam splitting interface.

Figure 3A:
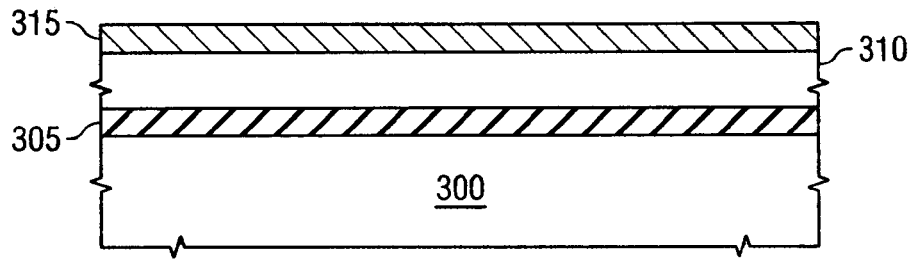
FIGS. 3A-3J illustrate exemplary fabrication process steps for fabricating a micromachined interferometer in accordance with embodiments of the present invention.
Figure 3B:
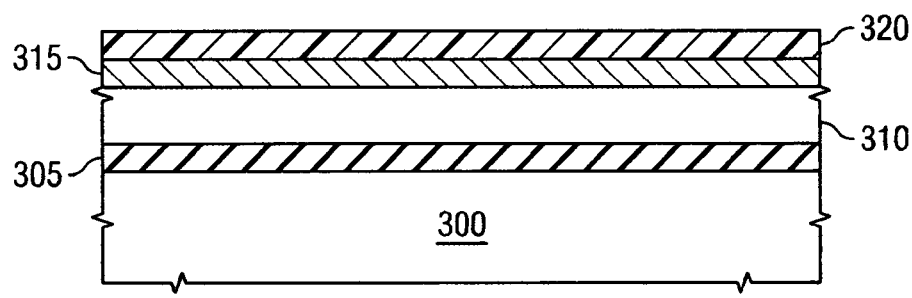
Figure 3C:
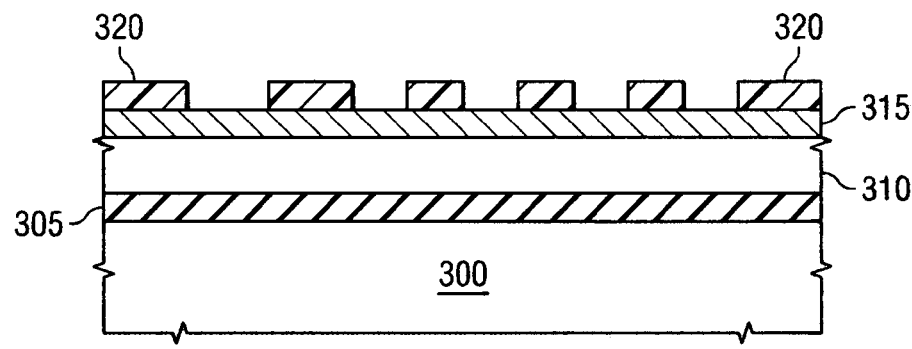
Figure 3D:
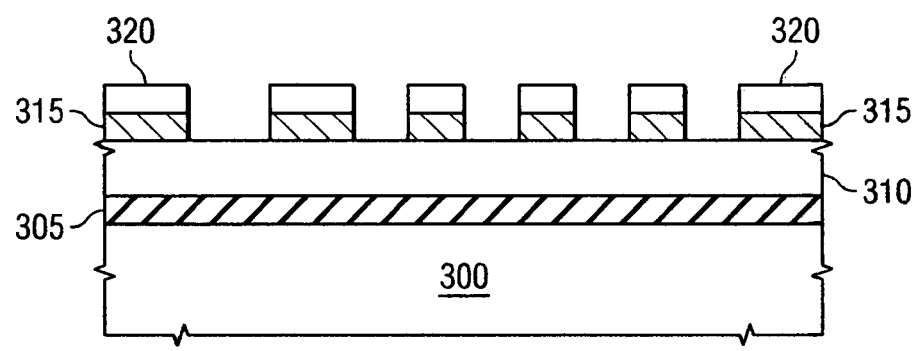
Figure 3E:
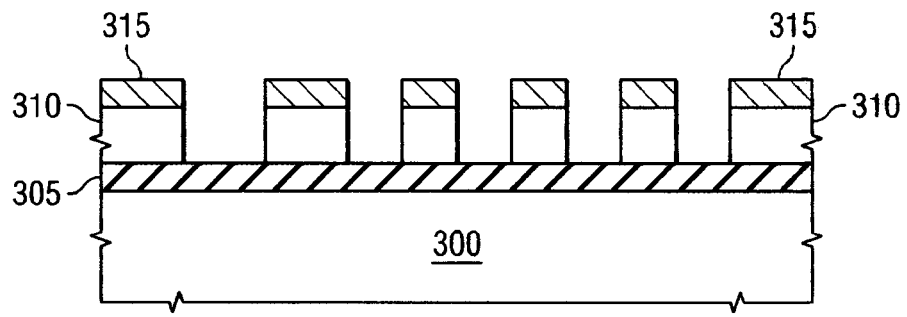
Figure 3F:
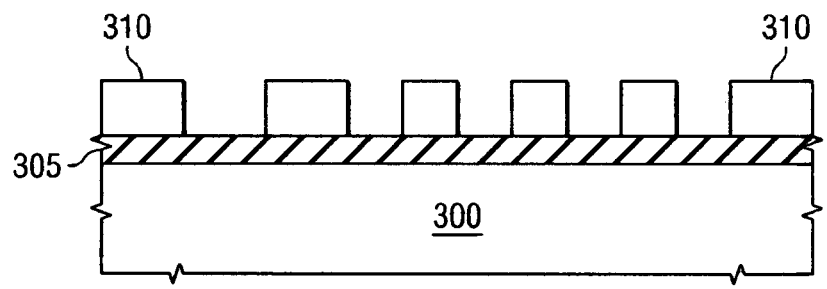

An exemplary fabrication process of the micromachined interferometer is shown in FIGS. 3A-3J. In FIG. 3A, an aluminum sputtering step is performed over an SOI wafer (layers 300-310) to form an aluminum layer 315, which functions as a mask for a subsequent etching of the top silicon layer 310 of the SOI wafer using DRIE, as shown in FIG. 3E. In FIG. 3B, a photo-resist material 320 is spun over the aluminum layer. In FIG. 3C, a lithography step is performed for realizing the mirrors, half plane beam splitter, fiber grooves, detector(s) and the electrostatic actuator. The lithography pattern in the photo-resist material 320 is transferred to the aluminum mask 315 by plasma chlorine etching of the aluminum layer, as shown in FIG. 3D. DRIE is then applied to the wafer until reaching the oxide etch stop layer 305 of the SOI, as shown in FIG. 3E. Finally, in FIG. 3F, the remaining aluminum mask 315 is removed using an Alu etch.

Figure 3G:
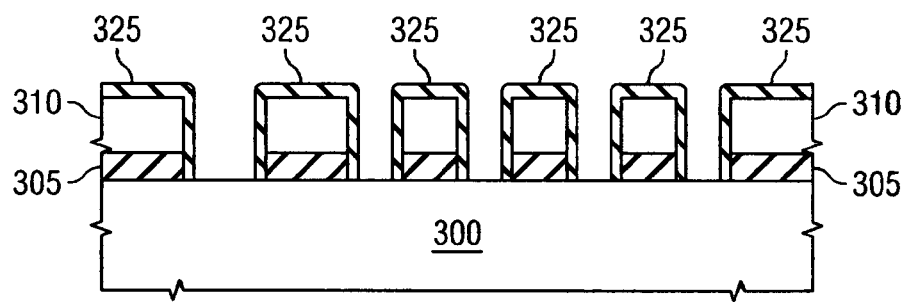
Figure 3H:
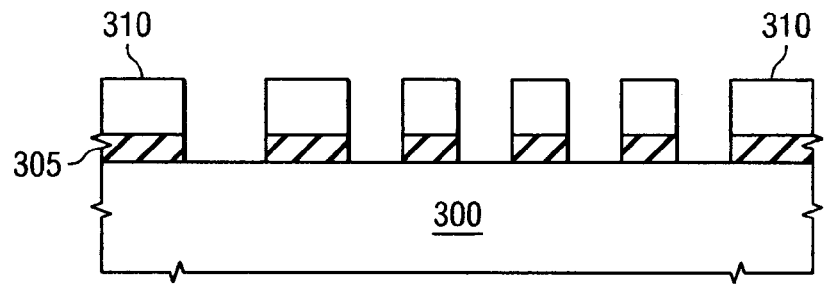
Figure 3I:
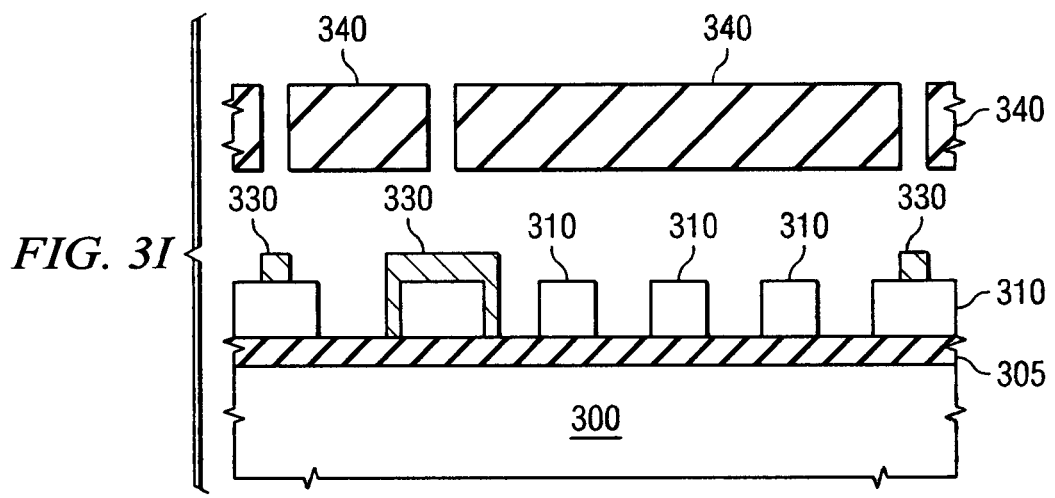
Figure 3J:
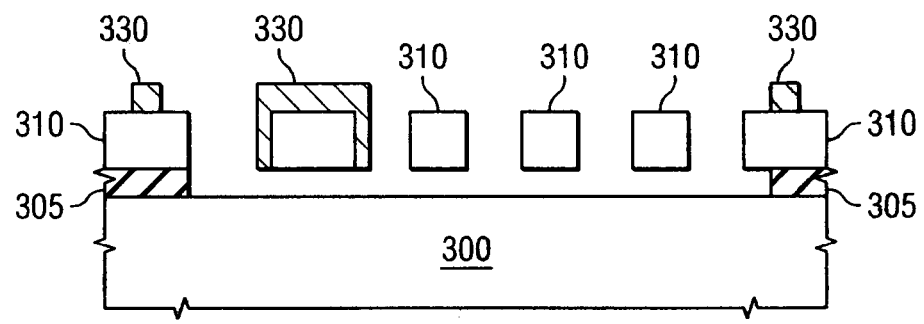

Turning now to FIG. 3I, a shadow mask 340 is used for the selective metallization 330 of the Michelson mirrors, as well as for creating connection pads. As shown in FIG. 3I, the shadow mask 340 is placed over the SOI substrate 300-310 to selectively sputter Cr/Au 330 onto desired portions of the top silicon layer 310. In embodiments in which non-metallic mirrors, such as Bragg mirrors, are used, the shadow mask step is not performed, and the pad metallization may be carried out at the beginning provided that metallization thickness is strong enough to survive the rest of the process steps. As shown in FIG. 3J, moving structures such as comb fingers, spring and moving mirror are released by etching the buried $SiO_2$ layer 305 using HF, while fixed structures are not released due to the wider area of the $SiO_2$ beneath.

In embodiments in which the Bosch process is used for DRIE etching (shown in FIG. 3E), rough mirror surfaces may result due to the periodic nature of the process. Thus, as shown in FIG. 3G, growing a thin oxide layer 325 on the surfaces and then removing it by HF, as shown in FIG. 3H, can be useful before structure release to ensure a smoother mirror surface. However, if a cryogenic DRIE process is used in FIG. 3E, the process steps shown in FIGS. 3G and 3H would be unnecessary since a smoother surface is obtained directly after etching. In addition, the aluminum mask shown in FIG. 3A is not necessary, as the process tends to have better selectivity between a photo-resist material and silicon at cryogenic temperatures.

Figure 4A:
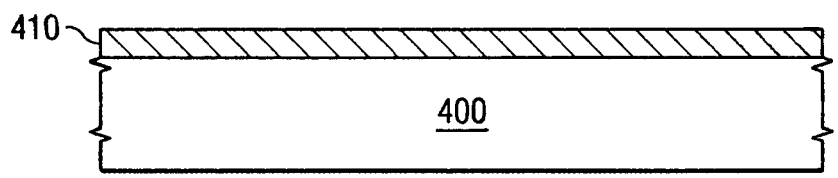
FIGS. 4A-4F illustrate exemplary fabrication process steps for fabricating a shadow mask in accordance with embodiments of the present invention.
Figure 4B:
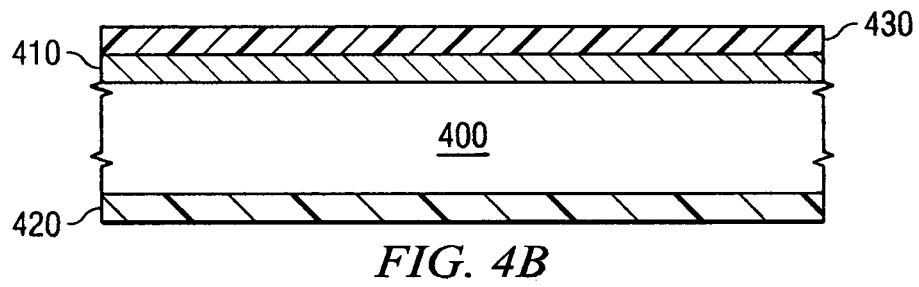

An exemplary process for creating the shadow mask is shown in FIGS. 4A-4F. As described above in connection with FIG. 3I, the shadow mask is used for the selective metallization of the wafer to ensure an adequate metallization for the mirrors, while at the same time protecting the half plane beam splitter. As shown in FIG. 4A, to create the shadow mask, first a metallic layer 410 is formed over a silicon wafer 400 using, for example, aluminum sputtering. Then, in FIG. 4B, a photo-resist material 420 and 430 is spun on both sides of the wafer 400. The top photo-resist material 430 is used for lithography, and the bottom photo-resist material 420 functions as an etch stop.

Figure 4C:
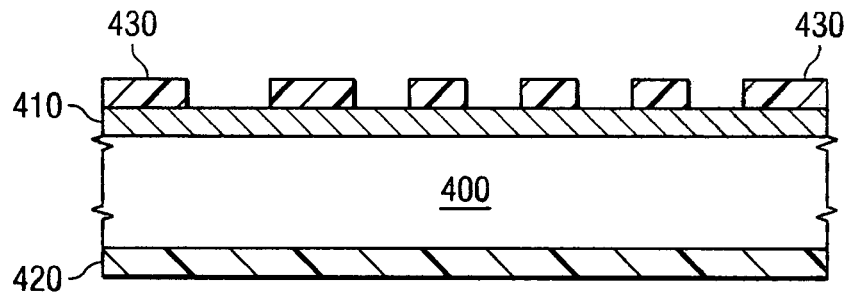
Figure 4D:
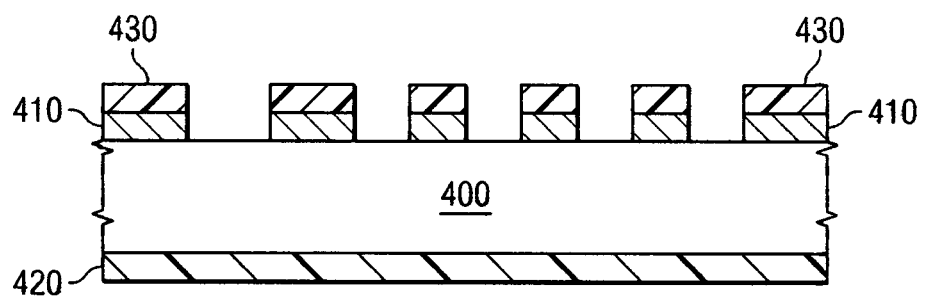
Figure 4E:
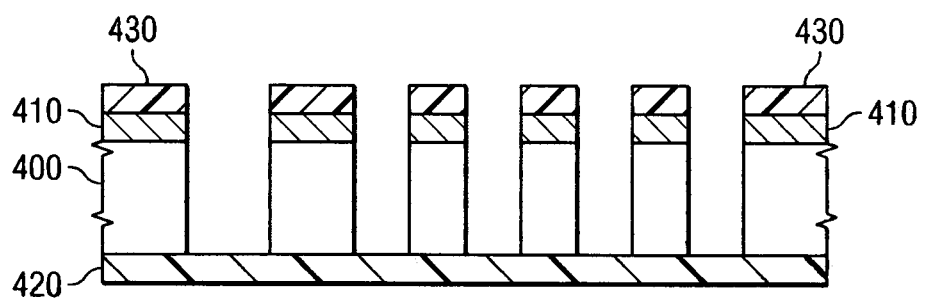
Figure 4F:
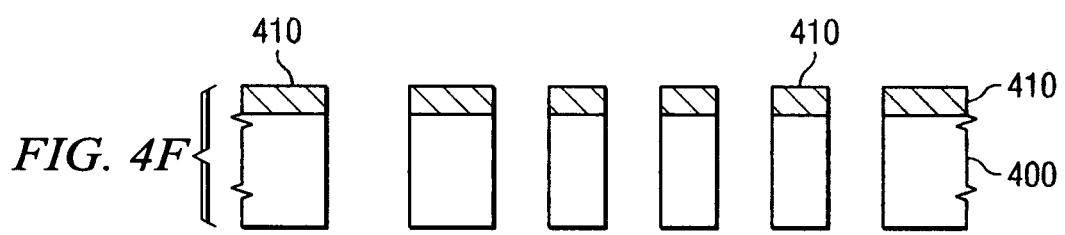

Subsequently, as shown in FIG. 4C, lithography is carried out on the top layer 430, followed by chlorine plasma etching of the aluminum layer 410, as shown in FIG. 4D. In FIG. 4E, using DRIE, etching through the silicon wafer 400 is performed until reaching the photo-resist material 420 on the bottom of the wafer 400. Finally, as shown in FIG. 4F, the photo-resist material 420 and 430 on the top and bottom of the wafer are removed to complete the shadow mask.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A micromachined interferometer, comprising:
   a half plane beam splitter optically coupled to receive an incident beam and to split said incident beam into two interfering beams, each propagating in a different medium;
   a fixed mirror embedded within a first medium and optically coupled to receive a first one of said interfering beams and to reflect said first one of said interfering beams back towards said half plane beam splitter to produce a first reflected interfering beam;
   a moveable mirror within a second medium and optically coupled to receive a second one of said interfering beams directly from said half plane beam splitter and to reflect said second one of said interfering beams back towards said half plane beam splitter to produce a second reflected interfering beam;
   a detection plane optically coupled to detect an interference pattern produced as a result of interference between said first reflected interfering beam and said second reflected interfering beam;
   an actuator coupled to said moveable mirror to cause a displacement of said moveable mirror, said displacement producing an optical path length difference between said two interfering beams equal to twice said displacement; and
   wherein in normal alignment conditions in which respective surfaces of said fixed mirror and said moveable mirror are perpendicular to respective directions of beam propagation, an angle between a plane of said fixed mirror and a plane of said moveable mirror is less than 90 degrees.

2. The interferometer of claim 1, wherein the first medium is silicon and the second medium is air.

3. The interferometer of claim 1, wherein the first medium is silicon, glass, Pyrex or quartz and the second medium is a gas or liquid.

4. The interferometer of claim 1, wherein said fixed mirror is positioned at an angle perpendicular to said first one of said interfering beams.

5. The interferometer of claim 1, wherein said first one of said interfering beams is produced from a partial transmission of said incident beam through said half plane beam splitter.

6. The interferometer of claim 1, wherein said second one of said interfering beams is produced from a partial reflection of said incident beam from said half plane beam splitter; and wherein a reflection angle of said second one of said interfering beams is equal to an incidence angle of said incident beam.

7. The interferometer of claim 1, wherein said actuator is an electrostatic actuator including a comb drive and a spring.

8. The interferometer of claim 1, wherein said fixed mirror and said moveable mirror are metallic mirrors.

9. The interferometer of claim 1, wherein said fixed mirror and said moveable mirror are non-metallic vertical Bragg mirrors.

10. The interferometer of claim 1, further comprising:
    an input fiber groove optically coupled to provide said incident beam to said half plane beam splitter; and
    an output fiber groove optically coupled to said detection plane.

11. The interferometer of claim 1, wherein said interferometer is a Michelson interferometer, a Mach-Zehnder interferometer or a Twyman-Green interferometer.

12. The interferometer of claim 1, wherein said detection plane includes a photodetector.

13. The interferometer of claim 1, wherein said interferometer is a Micro Electro-Mechanical System (MEMS) device.

14. The interferometer of claim 13, further comprising:
    a silicon on insulator (SOI) wafer including a top layer and a bottom layer;
    wherein said half plane beam splitter, said moveable mirror, said fixed mirror, said detection plane and said actuator are photolithographically defined within said top surface of said SOI wafer;
    wherein said moveable mirror and said actuator are released by sacrificial etching between said top layer of said SOI wafer and said bottom layer of said SOI wafer.

15. The interferometer of claim 14, wherein a fiber groove is photolithographically defined within said top surface of said SOI wafer to receive said incident beam.

16. The interferometer of claim 14, wherein:
    the first medium is silicon and the second medium is air; and
    said half plane beam splitter is formed by etching away part of said top surface of said SOI wafer to create an interface between silicon and air.

17. The interferometer of claim 1, wherein said half plane beam splitter consists of a single reflecting and refracting surface forming an interface between the first medium and the second medium, said incident beam being split into said two interfering beams at said interface, said first one of said interfering beams being a refracted beam refracted from said surface and said second one of said interfering beams being a reflected beam reflected from said surface.

* * * * *